March 9, 1926.

E. O. YOUNG 1,576,492

SLOT PROTECTOR FOR AUTOMOBILE FLOOR MATS

Filed Dec. 12, 1925

Inventor
Edward O. Young
by Wm. M. Monroe
Attorney

Patented Mar. 9, 1926.

1,576,492

UNITED STATES PATENT OFFICE.

EDWARD O. YOUNG, OF CLEVELAND HEIGHTS, OHIO.

SLOT PROTECTOR FOR AUTOMOBILE FLOOR MATS.

Application filed December 12, 1925. Serial No. 75,012.

*To all whom it may concern:*

Be it known that I, EDWARD O. YOUNG, a citizen of the United States, residing at Cleveland Heights, in the county of Cuyahoga and State of Ohio, have invented certain new and useful Improvements in Slot Protectors for Automobile Floor Mats, of which the following is a specification.

The objects of the invention are to provide improved means for preventing cold air or dust from rising through the slots in the floor of a motor car through which the operating levers pass, and thus giving annoyance to the chauffeur who has no way of avoiding the cold drafts or road dust that may arise when his feet rest on the levers.

It is understood that combination of rubber and metal or wool or hair, or bristles, have been employed which are expensive to manufacture, since it involves the use of more than one material and requires also the use of labor to manufacture and assemble the several parts.

In the present device, however, rubber alone is the material employed, and the side walls of the slots and the base to which they are attached are integral, as well as any additional resilient air excluding means, which may be employed to fill the slotted opening. Or additional air excluding means such as sponge or crêpe rubber may be sewed, stapled, cemented or vulcanized to the walls of the slot or slots.

The invention includes a rubber mat having a lever slot or slots therein, each slot being provided with vertically extended side walls that are inclined toward each other at their upper ends above the slots, and at their lower ends below the slots where they normally are in contact with each other, and are only separated by the passage of the lever between them. Also to preserve their close relation to each other they may be extremely flexible at their outer edges and may be thickened at their lower edges, and lateral buttresses or flanges may be employed to insure the proper inclination of these side walls and to press their outer edges together, both above and below the base portion and thus provide a double protection for the slot.

The invention is illustrated in the accompanying drawings, hereinafter further described and specifically pointed out in the claims.

In the accompanying drawings Fig. 1 is a transverse section of a simple form of the device.

Figure 3:
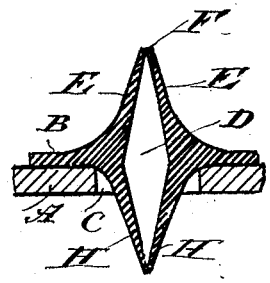
Fig. 3 is a transverse section showing upper and lower extensions of the side walls of the slot.
Figure 5:
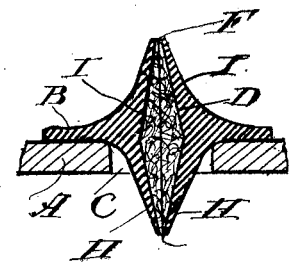

And Fig. 5 is a similar view of Fig. 3 showing additional air and dust excluding means.

In these views, A is the floor of the car, B is the rubber floor mat. C is a slot extending through the floor and D is a slot extending through the mat and having its side walls E. E. vertically extended and inclined and thin outer edges brought closely together at F. F.

The outer edges of the slots are preferably relatively thin and flexible to permit the lever to pass freely therebetween and the walls are preferably thickened at their points of unison with the mat to stiffen and reinforce them and the walls are inclined to maintain their outer edges in contact with each other, but to provide an opening adjacent to the mat sufficient to give full movement to the lever.

Figure 1:
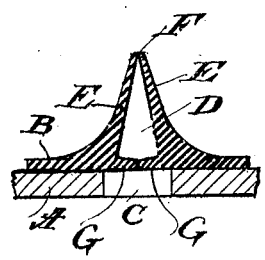

In Fig. 1 the walls are horizontally extended also at G. G. to close the slot when the lever is not passing therethrough.

Figure 2:
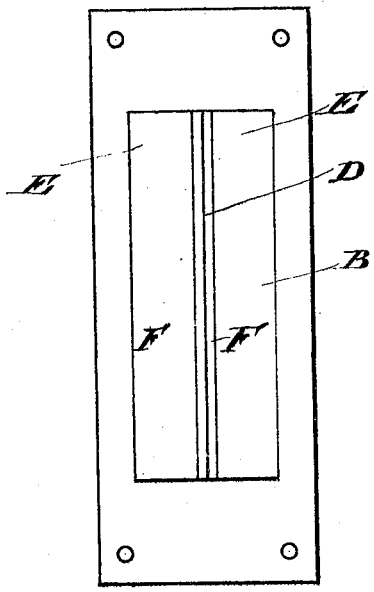
Fig. 2 is a plan thereof.

In Fig. 2 the walls are vertically extended at H. H. below as well as above the slot thus providing a double protection against the ascension of cold air and road dust.

Figure 4:
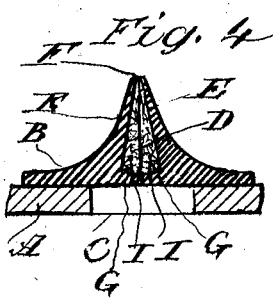
Fig. 4 is a similar view of the device shown in Fig. 1 with the addition of inner air and dust excluding means.

In Fig. 4 the slot shown in Fig. 1 is provided with additional means for closing the slot consisting in a heavy coating of rubber crêpe or sponge I therein which forms a resilient air and dust excluding means, easily pressed back by the lever and quickly restored again to shape after its passage.

In Fig. 5 the slot shown in Fig. 2 is shown lined with rubber crêpe or sponge rubber. The diamond shaped cavity shown in this figure is adopted to retain efficiently any dust excluding means inserted therein.

The crêpe or sponge rubber may be secured in place by vulcanizing, or may be cemented, sewn or stapled therein.

Having described the invention what I claim as new and desire to secure by Letters Patent is:

1. In a device of the character described a floor mat having a linear slot therethrough and vertically extended walls therefor, said walls being inclined to bring these outer edges closely together, the angles of union of said walls with said mat being reinforced, said side walls being extended above and below said mat to afford a double protection for said slot.

2. In a device of the character described a floor mat having a linear slot therethrough and vertically extended walls therefor, said walls being inclined to bring these outer edges closely together, the angles of union of said walls with said mat being reinforced and an inner lining therefor of resilient rubber cold air and dust excluding substance.

3. The combination with a rubber floor mat provided with a linear slot therein, of upper and lower extended side walls for said slot, said side walls extending laterally across said slot at different levels thereon and porous rubber enclosed in the cavity between said extended side walls and lining the said walls.

4. The combination with a floor mat having a linear slot therein of inclined side walls therefor extending above and below said mat, and contacting at their outer edges, said walls having flexible outer edges and reinforced bases connecting them with said mat and resilient porous rubber filling the cavity included between said side walls and lining said walls.

In testimony whereof I affix my signature at Cleveland, Ohio, this 11th of December, 1925.

EDWARD O. YOUNG.